United States Patent [19]

Fletcher et al.

[11] 4,035,065

[45] July 12, 1977

[54] LIGHTWEIGHT REFLECTOR ASSEMBLY

[76] Inventors: James C. Fletcher, Administrator of the National Aeronautics and Space Administration, with respect to an invention of Maurice J. Argoud, Los Angeles, Calif.; Jack Jolley, Venice, Calif.; Walter L. Walker, Duarte, Calif.

[21] Appl. No.: 617,202

[22] Filed: Sept. 24, 1975

[51] Int. Cl.$^2$ .................... G02B 5/08; B02B 7/18
[52] U.S. Cl. ................... 350/310; 350/288; 350/320
[58] Field of Search ........... 350/310, 320, 293, 288

[56] References Cited

U.S. PATENT DOCUMENTS

| | | | |
|---|---|---|---|
| 1,532,002 | 3/1925 | Thomson | 350/310 |
| 3,661,546 | 5/1972 | Busdiecker et al. | 350/288 |
| 3,754,812 | 8/1973 | Mohn | 350/310 |
| 3,841,737 | 10/1974 | Rambauske et al. | 350/310 |
| 3,856,384 | 12/1974 | Kryzhanovsky | 350/310 |
| 3,912,380 | 10/1975 | Klein | 350/310 |

*Primary Examiner*—John K. Corbin
*Assistant Examiner*—Jon W. Henry

*Attorney, Agent, or Firm*—Monte F. Mott; John R. Manning; Wilfred Grifka

[57] ABSTRACT

An inexpensive, lightweight reflective assembly member having good optical quality is provided. The reflective assembly is particularly adaptable to accommodating temperature variations without providing destructive thermal stresses and reflective slope errors. The reflective assembly may consist of a thin lamina reflective surface member and a lightweight substrate member of cellular structure. The respective materials may be chosen so that the coefficient of thermal expansion will be approximately the same. The substrate can comprise a cellular glass block while the reflective lamina member can be a thin sheet of glass with appropriate reflective coating. The lamina and cellular substrate member can be bonded together to form the reflective assembly. The method of fabrication includes abrading the cellular substrate with an abrasive master die to form an appropriate concave surface. An adhesive can be applied to the abraded surface and a lamina reflective surface can be placed under a uniform pressure to conform the reflective surface onto the desired abraded surface of the substrate.

17 Claims, 7 Drawing Figures

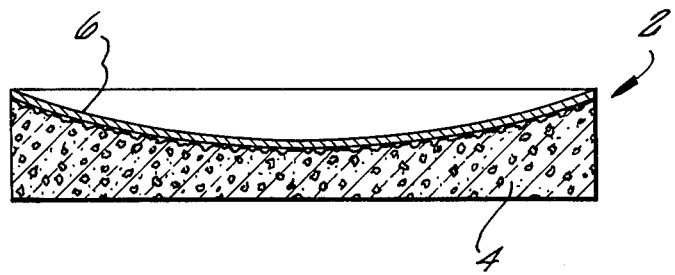
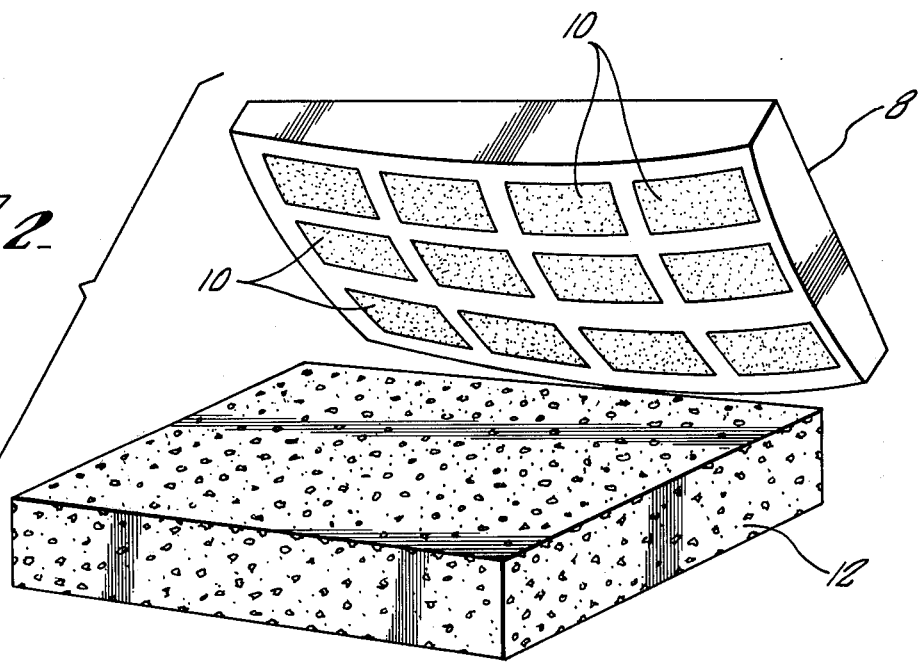
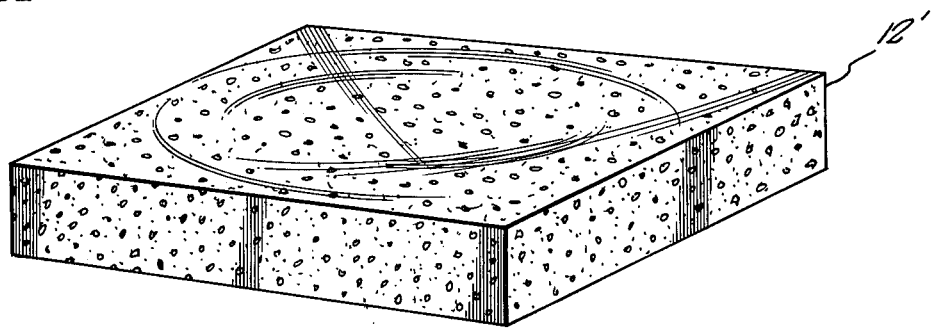

LIGHTWEIGHT REFLECTOR ASSEMBLY

BACKGROUND OF THE INVENTION

1. Origin of the Invention

The invention described herein was made in the performance of work under a NASA Contract and is subject to the provisions of Section 305 of the National Aeronautics and Space Act of 1958, Public Law 85-568 (72 STAT 435; 43 USC 2457).

2. Field of the Invention

The present invention generally relates to a lightweight reflector assembly and method of making the same and more particularly to an economical temperature independent reflector assembly capable of directionally diverting incident energy, such as solar energy.

3. Description of the Prior Art

Numerous examples of reflective structural elements for a variety of purposes are known in the prior art. The reflective elements have been utilized to direct various forms of energy, such as solar energy and visible light. Some forms of energy utilization have required relatively large reflectors, such as used in microwave, radio and radar antennas.

Recently, the energy crisis has required consideration of alternate sources of power, such as solar energy. In this regard, there have been suggestions to utilize relatively large reflective structures to concentrate solar energy for practical utilization. Reference is made to U.S. Pat. No. 3,884,217 issued on May 20, 1975 simply to disclose one form of an apparatus for reflecting solar energy. Generally, solar collectors provide an efficient method of making heat available for external system usage with a reasonable low heat loss for an appropriately designed reflective concentrator. Various configurations of solar concentrators have been attempted including troughs, parabolas of revolution, multiple reflectors, lenses, Fresnel reflectors, etc. One suggested solar power plant would utilize an array of concentrators (parabolas of revolution) with cavity receivers at their focus. Solar energy from the collector is piped to heat a fusion salt storage system by a pumped liquid metal heat transfer system. The pumped fluid temperature will be high enough to allow operation of a modern steam power plant using 1000°–1100° F steam.

To seriously consider thermionic power generation by solar energy, there must be sufficient concentrated solar radiation to provide a temperature range of 1100° C. There have been various suggestions to reflect solar energy radiation from a relative large number of individually steered mirrors or heliostats to a common target receiver. This approach to solar energy collection utilizes the transmission path of reflected light to bring relatively large quantities of energy to a central location. Large flat glass reflectors of approximately six meter by six meter size have been suggested to be connected to a large steel honeycomb core. The glass face sheets are permanently bonded to the steel honeycomb core and have been suggested to have a one-half inch thickness. An alternative reflector cover has been suggested as a second surface silvered, plastic film bonded to or inserted over a ¼ inch glass substrate.

As can be readily appreciated, solar concentrators of these types are relatively heavy and expensive. Advantageously, a solar energy collector that has a true parabolic shape pointed directly at the sun is more efficient in terms of energy collected per unit area of reflector than the flat and concentrating heliostat. The true parabolic reflective shape will provide a minimum solar image size, and therefore, a maximum concentration ratio. In addition, a parabolic collector will be more accurate in tracking the sun's relative travel.

As can be readily appreciated, the required output temperature of a solar collector to be used with a low temperature thermionic converter is approximately 1400° C, and would require a relatively large structure. Since a parabolic concentrating solar collector for thermionics will optimumly have a size of approximately a 36 foot diameter with an area of approximately 1,000 square feet, and further, will be movable to accurately track the sun, a lightweight reflective structure is necessary.

The key to the implementation of solar energy as a viable source of energy depends on the design — cost — performance relationships as compared to conventional sources of energy. A rough estimate of the total cost for paraboloidal collectors at $50.00 per square meter of projected surface was made in 1972. The cost today has obviously, increased. It has been recognized that an economical low cost solar power plant will require the development of a solar concentrating collector which can be produced in mass quantity at a relatively low cost, yet, incorporates and maintains the necessary surface quality and rigidity to assure collection of solar energy with high efficiency. It has been calculated that the concentrator area required for a 1000 MWe power plant is over $1 \times 10^8$ ft$^2$. Obviously, a low cost solar concentrator is the most important element in the power generation.

The solar power plant efficiency is another important factor and again, depends primarily on the efficiency of concentrating the atmospherically diluted rays of the sun by the concentrating surface into a focal point at the receptor/cavity aperture for conversion into useable heat. A practical concentration ratio of approximately 1000:1 with a surface reflectivity of 0.95 percent has been suggested. This ratio would allow energy collection at 1300° F with 74 percent efficiency. The 1300° F will permit the generation of 1000° F steam capable of driving conventional turbogenerators. The concentration ratio of 1000:1 would require a total slope error, that is, reflective surface slope and sun tracking error, of about 0.32°.

As any artisan in the field of optics realizes, the formation of a highly accurate concave reflective surface, or mirror, is not a problem with relatively small sizes. For example, glass blanks can be directly ground up to about 12 inches in diameter. However, this grinding technique is not applicable to large concave mirrors. A considerable amount of technical literature is available on the forming problems that exist in the field of telescope mirrors of giant size. It is not only difficult to fabricate a flawless glass blank of that diameter, but even assuming the fabrication, the frictional heat in grinding the glass blank leads to grinding dimensional inaccuracy, as well as, crazing of the surface. An example of a prior art method of forming a large collimating mirror can be found in the NASA Technical Report 32-1214 "Fabrication of the 23 ft. Collimating Mirror for the JPL 25 ft. Space Simulator" (1967). An example of a large nickel mirror obtained by electroforming the metal on a master produced by the spincasting of epoxy plastic is disclosed in the NASA Technical Memorandum 32-206 "Solar Performance Evaluation Test Program of the 9.5 ft. Diam. Electroformed Nickel Concentrator S/N 1 at Table Mountain, California." (1967)

An additional problem exists, in that the total weight of the final mirror makes it essential to include complex supporting structures to permit the desired angular movement. Attempts have been made to utilize very thin flexible glass sheets and gently form the bonded sheets to a concave metal backing surface. The bonding, however, of thin flexible glass sheets to the concave backing substrates created dimensional inaccuracies with only relatively small temperature changes. The thermal expansions that were created produce major internal stresses, cracking and crazing to a destructive degree. As can be readily appreciated, the optimum environment for a solar concentrator would be a desert climate which is subjected to an abnormally high temperature cycle between diurnal and nocturnal periods.

U.S. Pat. No. 3,868,823 recognizes the problems of manufacturing a reflective surface, and particularly, the cost and weight problems of mirrors required to reflect the sun's rays over a sufficiently large area. This patent seeks to avoid the problem by hot pressing metal foil into an asphalt surface to form a stationary reflector and then moving a target pipe to be heated by the sun's rays.

Another fabrication procedure has suggested the grinding of a large epoxy fiberglass sandwich by a master mold with a subsequent bonding of glass, plastic or metal foil to the substrate.

To date, the prior art has not provided a lightweight, low cost thermally stable reflector assembly that can provide optimum optical reflective characteristics in a dimensionally large reflector adequate for utilization as a solar energy concentrator or a large scale antenna.

OBJECTS AND SUMMARY OF THE INVENTION

It is a primary object of the present invention to provide a dimensionally stable, temperature independent large scale solar reflector assembly.

Another object of the present invention is to provide a reflector assembly of good optical quality.

It is a further object of the present invention to provide a low cost reflector assembly that can be efficiently made of individual reflector components to form a mosaic solar concentrator.

It is yet another object of the present invention to provide a figured foam glass substrate reflective element having a flexed bonded sheet with a reflective surface suitable for use as a reflective structural element for a variety of purposes in the directional reflection of energy, such as solar energy concentrators, microwave, radio and radar antennas.

It is still another object of the present invention to provide a reflector assembly capable of standing operating temperatures from a $-10°$ C to a $+55°$ C under variable operating environmental conditions.

It is an additional object of the present invention to provide an economical method of forming reflective elements having good optical quality that can be subsequently fabricated as reflective surfaces for solar concentrators and a variety of other purposes at a minimum of cost.

Briefly described, the present invention involves the use of a cellular glass substrate that has been appropriately abraded to a desired concave shape and bonded to a flat sheet of back silvered mirrored glass. An optically shaped master die has an appropriately abrasive surface and is applied to a block of foamed cellular glass with a gentle cyclic, or rotational, movement to lap the desired concave configuration of the die, or tool, into the glass cellular substrate. A thin lamina glass member having an approximate thickness of less than .1 inch will have its bottom surface appropriately coated with an epoxy adhesive. The lamina glass is appropriately positioned over the concavity of the substrate. A uniform pressure is applied to the glass lamina, for example, by a vacuum application through an appropriate hole, or bore, in the glass substrate or by an exterior flexible membrane. The individual reflective components can then be assembled in a mosaic pattern to form the desired reflector assembly. Reflector components have been manufactured with a reflective surface having a measured slope accuracy of plus or minus three minutes of arc. Alternatively, the concave contoured substrate surface can be coated with an epoxy material, and then subsequently, ground and lapped to a final contour for receiving a reflective coating, such as aluminum.

Further objects and the many attendant advantages of the invention may be best understood by reference to the accompanying drawings in which like reference symbols designate like parts throughout the figures thereof.

BRIEF DESCRIPTION OF THE DRAWINGS

FIG. 1 is a cross-sectional view of a reflector member of the present invention;

FIG. 2 is a perspective view of a cellular substrate member and an abrasive master die prior to an abrading step;

FIG. 3 is a perspective view of a cellular substrate member abraded to form a concave configuration prior to receiving a reflective surface;

DESCRIPTION OF THE PREFERRED EMBODIMENT

The following description is provided to enable any persons skilled in the appropriate art of large scale reflectors, and more particularly, optical reflectors for solar energy concentration to make and use the invention and sets forth the best mode contemplated by the inventors of carrying out their invention. Various modifications, however, will remain readily apparent to those skilled in the art, since the generic principles of the present invention have been defined herein specifically to provide a relatively economical and easily manufactured reflector assembly.

Figure 7:
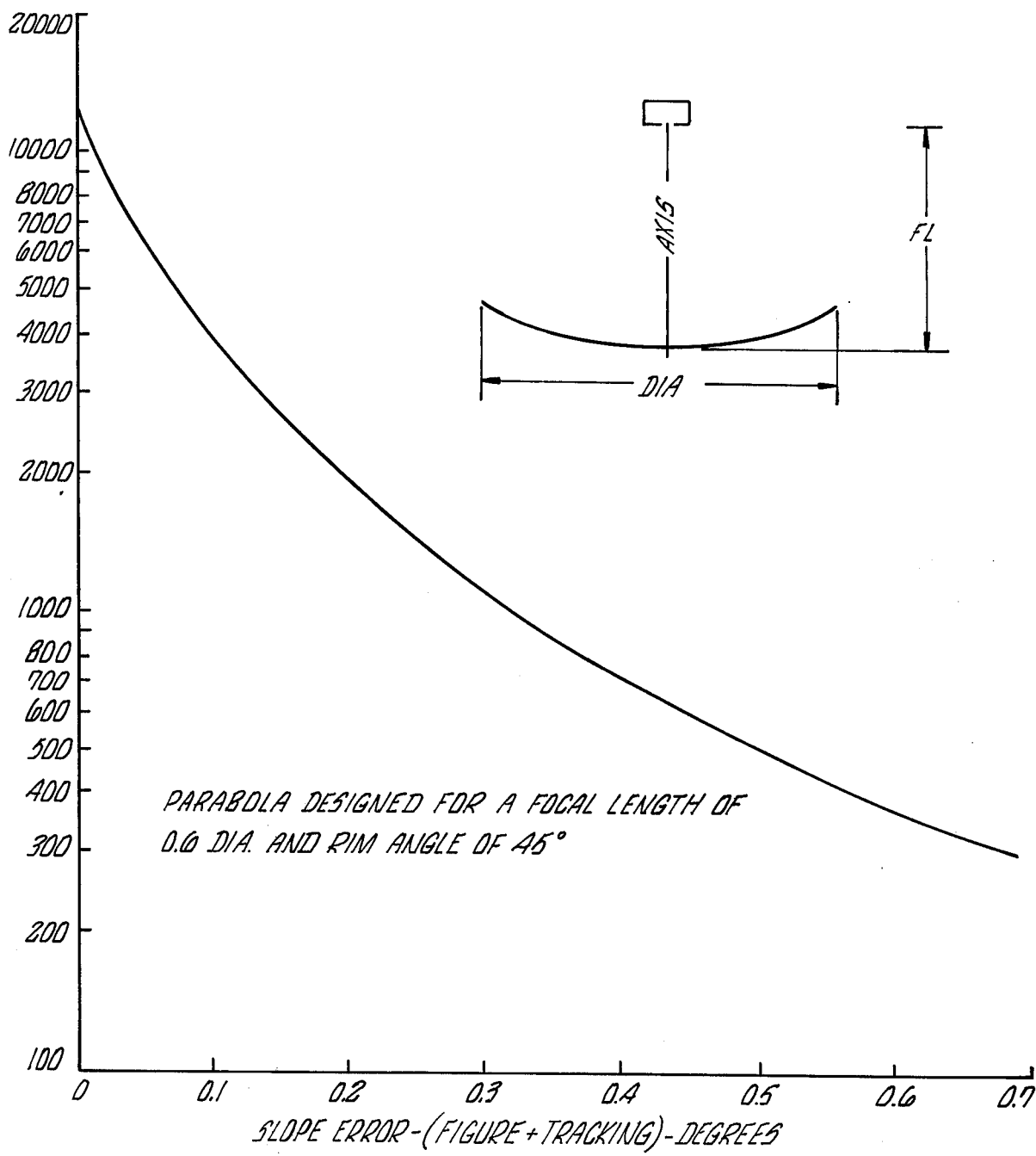
FIG. 7 is a graph of the concentration ration versus total slope error.

The derivation of the concentration ratio versus total slope error plot of FIG. 7 can be accomplished with the assistance of a computer. As well known by anyone skilled in the field of optic design, the actual design configuration of an optimum large scale parabolic mirror is determined by the energy concentration distributions in terms of deviations from a perfect parabolic shape. The specific calculations are subjective to the desired final results and for purposes of the present invention, it is not necessary to include these results, since the present invention is not limited to a specific large scale solar reflector.

The known approach to providing a relatively high quality optical reflective member of large dimension has required considerable skill and effort by slowly lapping a large glass or aluminum blank. A good optical reflecting characteristic requires a total flux reflectance of energy of approximately 90% or greater of the incident energy and a slope error under ten minutes at each point across the entire face of the reflector surface.

Another parameter which must be considered in designing a viable large scale reflective assembly, such as a solar collector, is the necessity of a low cost per square foot of reflector surface, e.g., $3.00 per square foot or less, to make it competitively feasible with other sources of energy. A relatively long, useful life is also required, and accordingly, the reflector assembly must be capable of withstanding environmental factors, such as temperature cycling, and stresses created by wind. In addition, the reflector assembly itself must be relatively lightweight to permit an economical tracking of the sun to maximize the collection of solar energy throughout the day.

These demanding parameters have been met in the present invention by attempting a different approach to fabricating a large reflective surface and the solution has resulted in a unique reflective member and process described hereinafter.

Referring to FIG. 1, a reflective member, or component, 2 is disclosed in a cross-sectional view. The reflective component 2 comprises a cellular substrate 4 having a lamina reflective surface member 6 connected thereto. The cellular substrate 4 has a predetermined surface configuration, such as concave and the reflective surface member 6 conforms to the cellular surface substrate and can be held in place by an epoxy resin adhesive bonding, such as D.E.R. 332, sold by Dow Chemical Company. The cellular substrate 4 is lightweight because of its cellular structure, while at the same time, it has sufficient flexural strength and dimensional stability to be combined with other reflective components to form a desired reflector assembly, such as a solar concentrator.

In addition, the cellular substrate 4 has the characteristic of being easily eroded, or abraded, to form a predetermined surface configuration. Advantageously, the cellular substrate will have the same coefficient of thermal expansion as the reflective surface 6. Thus, when the reflective component 2 is subjective to temperature variations, for example, in a desert environment, there will be no problems created by thermal stresses to disrupt or destroy the reflective surface itself, or warp the configuration of the reflective surface short of destruction to introduce slope error.

Advantageously, the cellular substrate 4 will be formed from a glass composition and a preferred material is sold by Pittsburgh Corning under the trademark, FOAMGLAS. This product is normally utilized as insulation for both buildings and pipes and has been suggested for use in the solar energy field only as an insulating conduit for a flat plate solar absorption collector. The FOAMGLAS cellular substrate has a linear coefficient of expansion of $8.3 \times 10^{-6}/°C$ with a shear strength of $3.5 kg/cm^2$. The material is basically a pure inorganic glass without binders and physically has a honeycomb cavity structure. The FOAMGLAS has excellent insulating properties with thermal conductivity at 25° C equal to $0.047 kcal/mh°C$. The material is impervious to water vapor, non-combustible, has excellent dimensional stability and has an average density of $136 kg/m^3$.

The particular shape of the cellular glass substrate 4 surface can be created by manufacturing the substrate in specific molds of desired configuration. However, the relative low cost of the cellular glass material permits a process of manufacturing wherein a block of the glass cellular substrate can be shaped to a desired configuration by an abrasive master die.

Referring to FIG. 2, an opticaly shaped master die 8 can be made in the conventional manner by machining, grinding and polishing. Advantageously, the material of the master die may be aluminum, iron or steel. After the desired shape is formed on the master die 8, fine abrasive powder, or material, 10 can be secured to the optical die face. Advantageously, the sections of the fine abrasive material 10 can be provided with open spaces between the sections so that the dislocated abraded material may accumulate in the interim spaces. Alternatively, slots may actually be formed in the face of the master die 8 in the spacings between the abrasive sections so that the abraded material can pass through to a waste receiver.

A cellular glass substrate blank 12 can be eroded, or abraded, with a gentle lapping motion of the master die 8. This can be accomplished with either a wet or dry surface on the cellular glass blank 12. A source of water can be used to remove the waste abraded material. Because of the relative low shear strength of the cellular glass blank 12, only a short period of time is necessary to produce the desired configuration. Obviously, mass production can be accomplished with machines designed specifically for abrading the substrate 12. If desired, a rough abrasive material can be initially utilized and then a subsequent finer abrasive material will finish the lapping of the substrate to the desired shape. Referring to FIG. 3. the cellular glass blank 12' is disclosed after it has been lapped by a master die 8 to form a concave surface configuration.

In the preferred embodiment of manufacturing a reflector assembly, a thin glass lamina having a silvered back surface that can be sealed, is utilized to form the desired reflective surface of the reflective member 2. Generally, the glass lamina 14 will have a thickenss of less than 0.1 inch. Glass lamina 14 in the range of 0.012 to 0.125 inches in thickness have been utilized successfully. Preferably, the glass lamina 14 is sealed adjacent its edge to protect the silvered surface from the environment, thereby insuring a long productive life for the reflective member.

Figure 4:
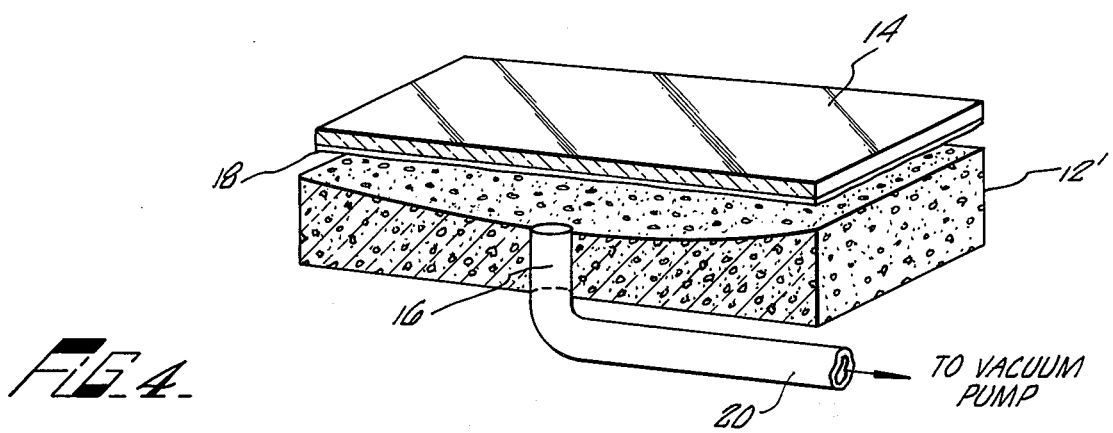
FIG. 4 is a perspective view of the relationship of the cellular substrate and a reflective lamina member.

As can be seen in FIG. 4, the cellular glass blank 12° has a central perforation, or conduit, 16 permitting exterior access to the concave lap surface. The glass lamina 14 is coated with an appropriate epoxy cement, or adhesive, 18. The conduit 16 is provided with an appropriate fitting to receive a vacuum line 20 attached to a pump, or the like. As stated earlier, the cellular substrate 12' has a plurality of glass cells or cavities, but the individual cavities are sealed and render the cellular substrate 12' non-porous. The back silver glass lamina 14 with the adhesive coating 18 is placed on the cellular glass blank 12' and the vacuum line 20 is attached to a vacuum source. As even uniform pressure is applied across the glass lamina 14 and forces it to conform to that of the desired configuration of the substrate 12'. The glass surface of the glass lamina 14 is exposed but the back silver surface is protected when cemented to the contoured cellular substrate 12'. The edges of the glass lamina 14 can be appropriately sealed, if not already sealed.

When the glass lamina sheet 14 is initially placed over the concavity of the substrate 12', the thin layer of epoxy adhesive is still plastic. This allows the appropriate flexing of the glass lamina 14 under differential pressure. After the glass lamina 14 has been drawn down to the desired contour, the epoxy cement can be cured either at ambient temperature, or if accelerated bonding is desired, in an oven. Due to the rough exposed cellular surface, it is believed that the epoxy resin 18 permits the rim edges of the exposed cells to contact the glass lamina 14. Generally, the vacuum line 20 will remain connected to the vacuum source until the epoxy is cured, or a valve (not shown) can be installed to isolate and maintain a vacuum.

A cross section of the finished product is disclosed in FIG. 1 and prototypes that have a reflective surface with a measured slope accuracy of plus or minus three minutes of arc, have been produced. The finished reflector segments, or components, 2 can be cut, or trimmed with inexpensive tools to fit any desired mounting configuration for use in, for example, a solar concentrator 22, such as that typically shown in FIG. 6, a series of reflector members segments, or components, 24, for example, of 2 meters in length can be joined to form a large diameter reflective surface. It is also possible for a large cellular glass blank to be directly abraded to form the solar concentrator.

Referring to FIG. 7, a plot of a Concentration Ratio versus Total Slope Error is disclosed for a parabolic solar concentrator having a focal length (FL) of 0.6 diameter of the parabolic configuration. The rim angle of the parabolic slope is set at 45°. The concentration ratio is the ratio of the total reflective surface to the collector aperture. The total slope error includes both the tracking error of following the relative movement of the sun, usually about 0.1°, plus the physical surface slope error. As mentioned above the concentration ratio of the sun's rays must be about 1:1000 ratio to permit generation of superheated steam necessary to drive conventional turbogenerators.

Referring to FIG. 7, it can be seen that a concentration ratio of 1:1000 can be achieved with a total slope error of approximately 0.3°. Since a permissible tracking error of 0.1°included within the total slope error then the solar concentrator must be within a physical slope error of 0.2° to function as a viable competitive source of energy. In addition, the solar concentrator must be relatively inexpensive and capable of maintaining its shape over a temperature cycle of at least −10° C to +55° C. Finally, to justify the capital expenditure, the solar concentrator must have a useful life cycle of ten to twenty years.

The present invention meets each of the above criterion and provides a reflector component with a physical slope error less than 0.1°. The reflector surface can also be a silvered surface with a corresponding high reflectivity, e.g., 0.95 − 0.97, at a relatively low cost. The matching of the thermal coefficients of expansion of the glass cellular substrate 12 with the glass lamina 14 permits the resultant reflective component to maintain its high optical characteristics even while subject to temperature changes.

Figure 6:
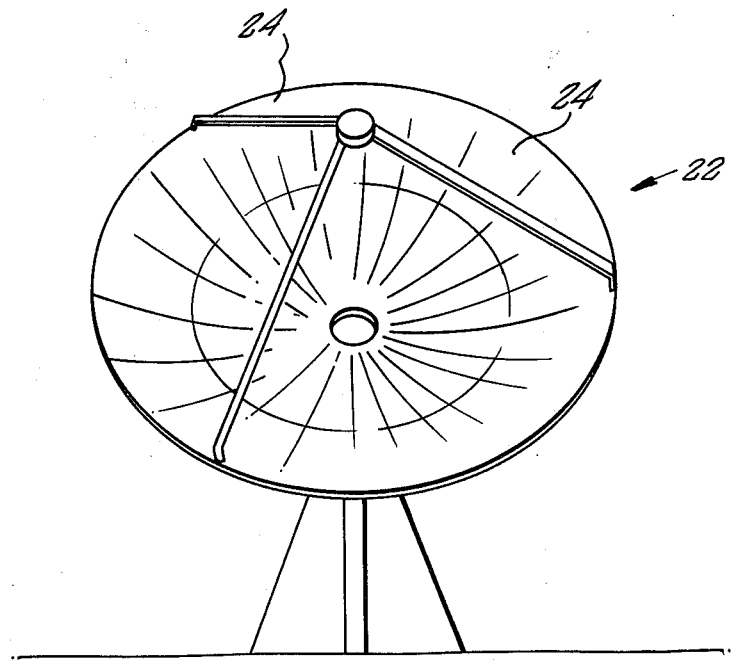
FIG. 6 discloses a schematic illustration of a lightweight solar energy collector assembly formed of a plurality of reflective members.

Very generally, the parabolic solar concentrator 22 of FIG. 6 is used for concentrating the heating effect of rays emitted from a source of energy, such as the sun. The heat produced is available for performing useful work, such as production of electrical power, production of hydrogen and oxygen from water, gasification of coal and oil, industrial heating, etc. The solar concentrator 22 is shown in FIG. 6 for purposes of illustration and description for use with the sun as the source of energy. However, the concept of a relatively inexpensive reflector assembly is not limited to the use of the sun as the source of energy. The reflector assembly can be useful in concentrating rays in general.

Apart from the field of solar energy, the reflector components of the present invention can be used to form large telescope reflectors and small reflectors can be made as a one piece assembly. Deep dish configurations can be made by initially molding the foam cellular glass to an approximation of the desired contour with a final figuring performed as described in the process steps mentioned above. Finally, a very flexible glass lamina sheet can be bonded to the contoured surface.

It is also possible to fabricate dish reflectors for large radio, microwave and radar antennas, reflectors for search lights, collectors for high powered xenon short-arc discharge lamps and other reflectors with an improved economy. The lightweight feature of the present invention makes it particularly applicable for outer space use.

Alternatively, the contoured surface of the abraded cellular substrate 4 could be directly sprayed with GEL COAT, White 46-32, a Primer Surfacer sold by Ramanel, ground and lapped to a final contour and then aluminized to form a reflective surface. It is also possible to reprocess the foam glass to generate a solid glass facing from the foam glass substrate directly, for example, by localized fusing of the substrate surface. Such a processed solid glass surface will be suitable for aluminizing after a final polishing.

Figure 5:
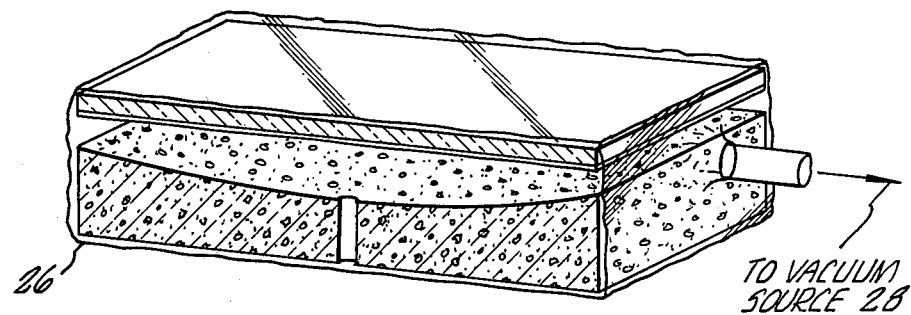
FIG. 5 is a perspective view of a vacuum bag process step.

Referring to FIG. 5, an alternative process step of securing the glass lamina 14 of the epoxy coated glass lamina 14 to the cellular substrate 12' is disclosed. In this regard, the glass lamina 14 is placed on its appropriate position on the lapped cellular glass substrate 12' and then surrounded with a pliable or flexible sealed container, or bag. The bag 26 is then evacuated by a vacuum source 28 to apply a uniform pressure across the surface of the glass lamina 14.

The preferred embodiment has been disclosed with a glass lamina forming a reflective surface member with a glass cellular substrate forming a support. It is believed that the embodiment will permit solar energy to become a viable source of energy by providing for the first time, a high quality lightweight reflective surface capable of permitting concentration ratio of greater than 1:1000 at a minimal cost. It is possible in certain applications to replace the glass lamina with a more pliable material, such as an aluminum, or plastic material. The glass cellular substrate also serves to thermally isolate any supporting structure due its good insulating characteristics.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

What is claimed is:

1. A nonplanar solar energy reflector assembly for the reflection of solar energy comprising:
    a nonplanar reflective member capable of reflecting solar energy including a protective outer thin glass surface having a sealed interior reflective surface and
    a foam glass substrate member of cellular structure having approximately the same coefficient of thermal expansion as the reflective surface, the substrate member directly bonded to the reflective surface.

2. The invention of claim 1 wherein the coefficient of thermal expansion is approximately the same for both the reflector member and the substrate member.

3. The invention of claim 1 wherein the substrate member has a low shear strength approximately of 3.5kg/cm$^2$ to permit formation of a predetermined support surface.

4. The invention of claim 2 wherein the reflective member is a thin flexible glass member connected to a cellular glass substrate.

5. The invention of claim 4 wherein the reflective surface is non-planar.

6. The invention of claim 4 wherein the reflective surface glass member has a thickness less than .125 inches.

7. The invention of claim 6 wherein the cellular substrate has a concave surface, the reflective glass surface member is also concave and in a state of stress resulting from an original relatively unstressed flat configuration which has been stressed to conform to the concave configuration of the substrate.

8. The invention of claim 2 wherein the reflector assembly is lightweight, the cellular structure having a density of less than 200kg/m$^3$.

9. The invention of claim 2 wherein the maximum physical slope error of the reflective surface is no greater than 0.2°.

10. The invention of claim 1 wherein the substrate member has a density of less than 200kg/m$^3$ and a shear strength of at least 3.5kg/cm$^2$.

11. The invention of claim 10 wherein the reflective surface glass member has a thickness less than 0.125 inches.

12. In a solar concentrator for the concentrated reflection of solar energy to a focal point, the improvement being a reflector member comprising:
    lamina reflective surface member capable of reflecting a predetermined bandwidth of solar energy having an exterior protective outer thin glass surface with a reflective coating on the interior glass surface, and
    a lightweight foam glass substrate member of cellular structure having a predetermined surface configuration complimentary to the desired reflector assembly reflectance characteristic, the lamina member being bonded to the cellular substrate member surface and assuming the surface configuration, the maximum physical slope error of the reflective surface being less than 0.2° whereby a concentration ratio of at least 1:1000 can be generated.

13. The invention of claim 12 wherein the coefficient of thermal expansion is approximately the same for both the lamina member and the cellular substrate member.

14. The invention of claim 12 wherein the lamina member has a thickness less than 0.125 inches and the surface configuration is concave.

15. The invention of claim 13 wherein the cellular substrate surface has a concave configuration and the lamina member is glass.

16. A reflective member for reflecting energy such as solar energy comprising:
    a reflective member having at least one reflective surface of at least 0.90 reflectivity of solar energy and a maximum surface slope error of less than 0.2° including an exterior protective outer thin glass surface extending over the reflective surface;
    a lightweight foam glass substrate member having a plurality of closed cells extending throughout the substrate body; and
    a connecting medium for fastening the reflective member to the substrate member with the reflective surface facing away from the substrate member, the respective coefficient of thermal expansions of the reflective member, and substrate member being approximately the same.

17. The invention of claim 16 wherein the reflective surface is non-planar and the substrate member has a complimentary non-planar support surface.

* * * * *